May 25, 1943.　　　B. R. BENJAMIN　　　2,320,169
TRACTOR PLANTER
Filed Dec. 18, 1941　　　2 Sheets-Sheet 1

Inventor:
Bert R. Benjamin.
By Paul C. Pippel
Atty.

May 25, 1943.  B. R. BENJAMIN  2,320,169
TRACTOR PLANTER
Filed Dec. 18, 1941  2 Sheets-Sheet 2
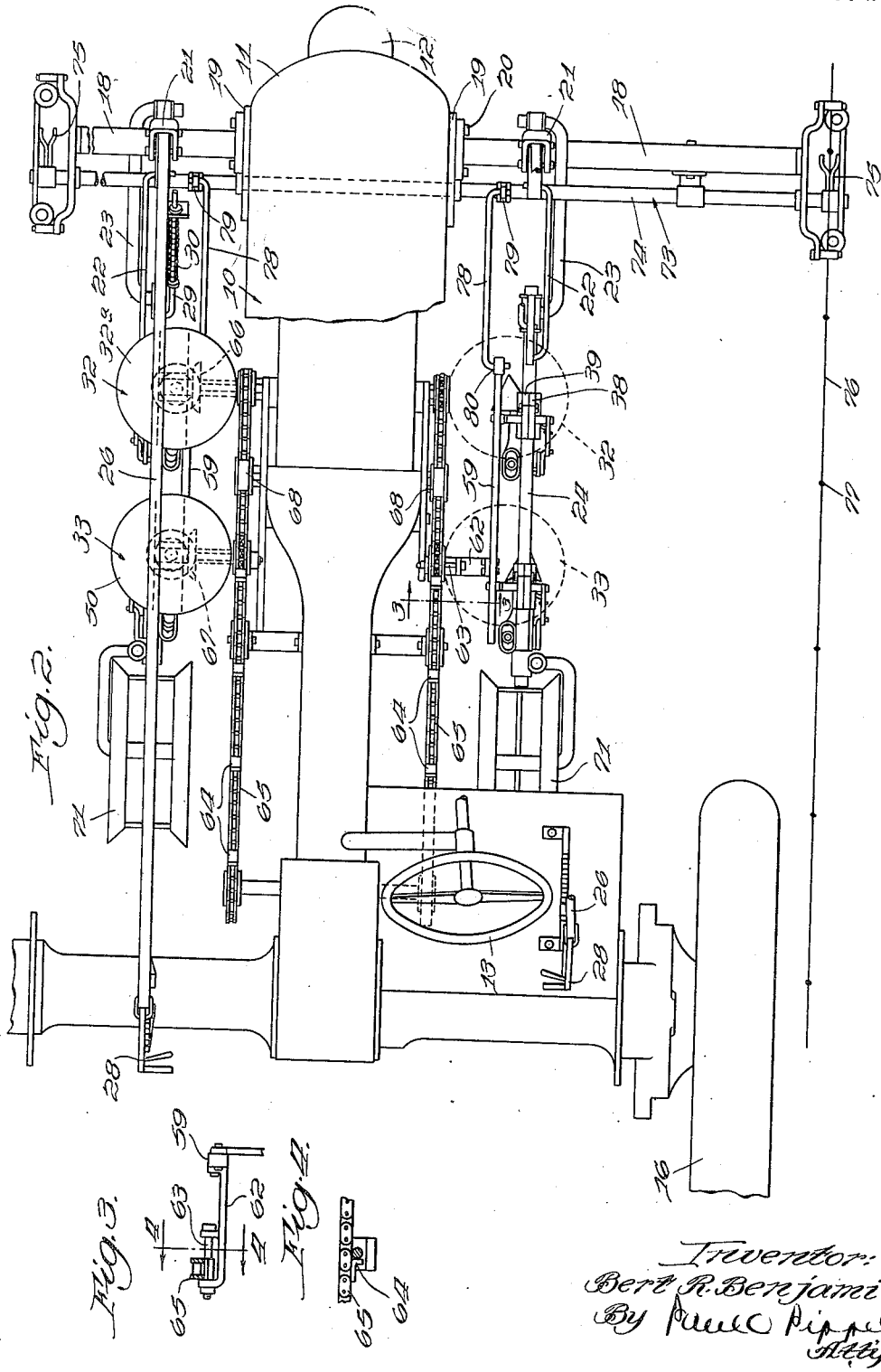
Inventor:
Bert R. Benjamin.
By Paul Pippel
Atty.

Patented May 25, 1943

2,320,169

UNITED STATES PATENT OFFICE 2,320,169

TRACTOR PLANTER

Bert R. Benjamin, Oak Park, Ill., assignor to International Harvester Company, a corporation of New Jersey Application December 18, 1941, Serial No. 423,506

9 Claims. (Cl. 111—35)

This invention relates to tractor-mounted planters and, more particularly, to the hill-drop mechanism therefor.

It is an object of the present invention to provide a hill-drop device for planters which can be selectively operated either by a check-wire device or a power take-off mechanism on a tractor.

It is another object of the invention to provide a fertilizer dispensing mechanism for a planter with the hill-drop mechanism that can be operated by a check-wire operating device or by a power take-off device, wherein fertilizer will be hill-dropped the same as the seeds are hill-dropped, and thus to economize on the fertilizer used in a planting operation.

It is still another object of the invention to provide common means for supporting the respective furrow openers and spouts of the respective fertilizing and planting mechanisms, wherein the same may be adjustable longitudinally, depending upon the desired spacing of the seeds in the plant row; that is, the devices are adjustable for planting of seeds and the bunching of fertilizer at distances of, say, from 14 inches to 42 inches apart, depending upon the nature of the crop being planted.

It is still another object of the invention to provide in a planting arrangement for tractors a common means for supporting the hill-drop structure and the check-wire device.

According to the present invention, there is connected to the tractor a seed dispensing mechanism and a fertilizer dispensing mechanism, one located in advance of the other and so spaced that fertilizer will be dropped in a bunch either by a check-wire mechanism or by power take-off mechanism associated with the tractor at a time previous to the dropping of the seed. Associated with each of the fertilizing and planting mechanisms is a hill-drop structure, and these structures are connected together to be operated simultaneously by either the check-wire device or the power take-off mechanism. These hill-drop devices are mounted on a common supporting frame, separate from their hoppers which are carried directly on the tractor, and for vertical movement to and from a ground-working position. On this common supporting means for the hill-drop structure the same may be adjusted longitudinally depending upon the desired spacing between the seeds being planted along the row. As seeds are deposited in one location, fertilizer is deposited in advance thereof at another location. The timing is such that, as the tractor moves along, the next planting of the seed will take place adjacent to the previous deposit of fertilizer and, at the same time, another deposit of fertilizer will be made in advance of this planting. The check-wire device and the power take-off mechanism is correspondingly arranged and adjusted so that the depositing of seed will take place at a location of the previous depositing of fertilizer.

For a better understanding of the invention, reference may be had to the following detailed description taken in connection with the accompanying drawings, in which:

Figure 2 is a plan view of the tractor and of the combined arrangement and showing the planting and fertilizer devices on both sides of the tractor;

Figure 3 is a detail view of the chain drive connection taken along the line 3—3 of Figure 2 and looking in the direction of the arrows thereof; and Figure 4 is another detail view taken along the line 4—4 of Figure 3 and looking in the direction of the arrows thereof.

Figure 1:
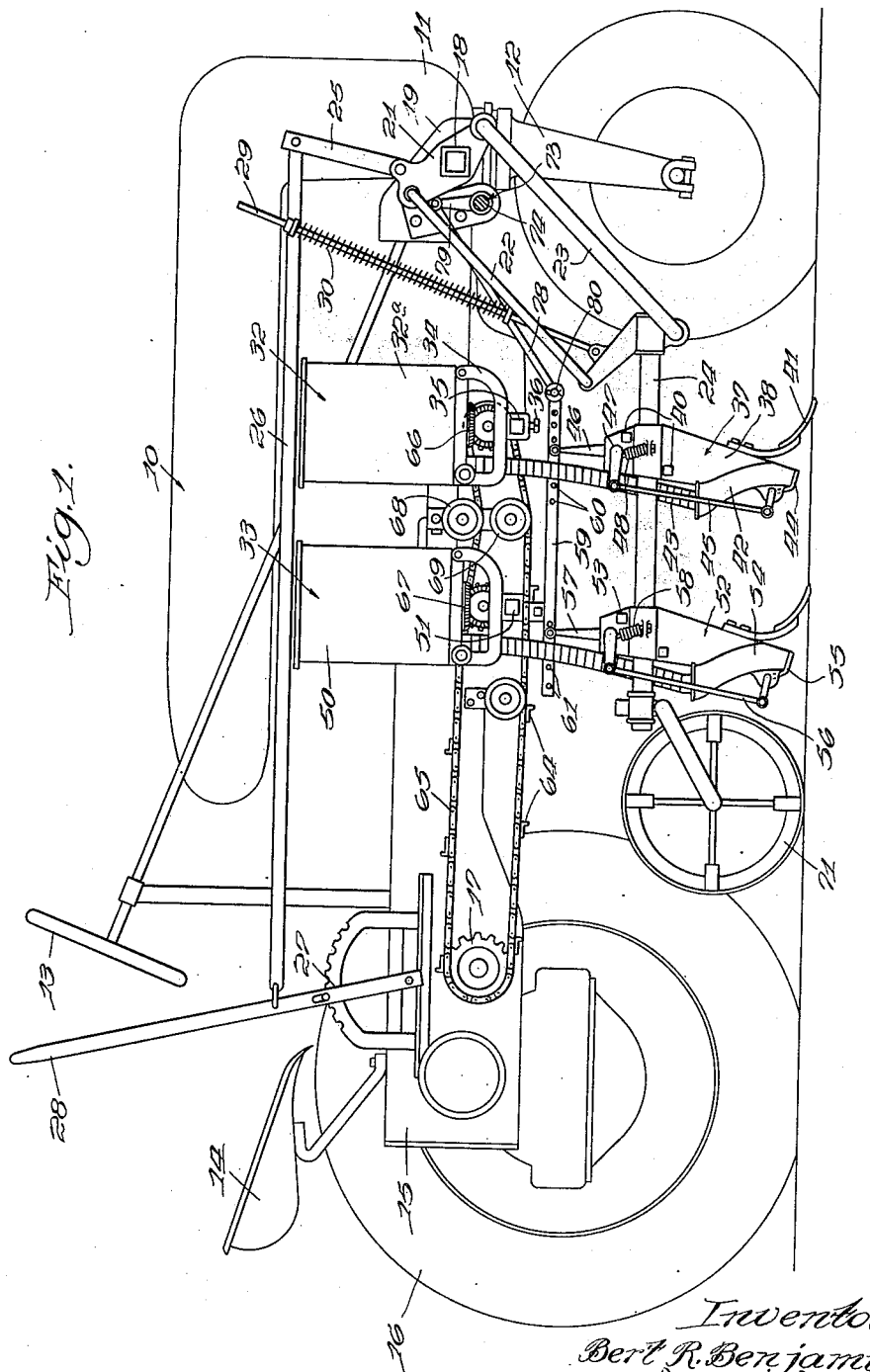
Figure 1 is a side elevational view of a tractor with the combined fertilizer and seed planting arrangement embodying the features of the present invention connected thereto.

Referring now particularly to Figures 1 and 2, there is shown a tractor 10 having a forward portion 11 supported on a dirigible wheel structure 12 adapted to be steered by a steering mechanism 13 accessible to an operator's station 14 located on a rear portion 15 of the tractor. The rear portion 15 is supported on traction drive wheels 16 and has a power take-off device 17. To the forward portion 11 of the tractor is respectively connected at opposite sides thereof a transversely extending beam member 18. This beam member has an attaching plate 19 adapted for the securing of the beam to the side wall of the tractor by means of bolts 20. To each beam 18 is connected a bracket structure 21 to which is connected a pair of upper and lower parallel links 22 and 23 on the lower end of which is a rigidly connected longitudinally extending rig frame 24. The bracket 21 also has pivoted thereto a fore and aft pivotable lever 25 to the upper free end of which is connected a longitudinally extending lift pipe 26 which extends rearwardly to the rear portion of the tractor for connection with a manually operable adjusting mechanism 27 having a hand lever 28 accessible to the operator's station 14. The forward end of the lift pipe 26 is connected with the rig structure 24 by means of a lift rod 29. This lift rod 29 carries a usual pressure spring 30 which functions in the well-known manner to maintain the working tools carried by the rig structure 24 in their ground-working position. As the lift pipe 26 is advanced forwardly, the lift rod 24 will cause the rig structure to be raised and thereby effect lifting movement of the same with the links 22 and 23 pivoting about the bracket 21. The mechanism thus far described is provided on both sides of the tractor, as shown in Figure 2.

Also on both sides of the tractor there is provided a fertilizer dispensing mechanism, indicated generally at 32, and a seed dispensing mechanism, indicated generally at 33. The fertilizer mechanism 32 includes a hopper structure 32a having a supporting bracket 34 adapted to be attached to a transversely extending bar 35 carried by the tractor and to be secured to said bar 35 by a set screw 36. The fertilizer mechanism also includes a hill-drop structure 37 adjustably carried on the longitudinally extending rig structure 24. As shown more clearly in Figure 2, the hill-drop structure 37 includes separable parts 38 and 39 which are shaped to nest the rig structure 24. These parts 38 and 39 are clamped together by clamping bolts 40, whereby the hill-drop structure 37 can be rigidly secured to the rig structure 24. Upon unloosening the clamping bolts 40, the hill-drop structure 37 may be adjusted longitudinally along the rig structure 24. The hill-drop structure 37 carries a furrow opening element 41 and a spout 42 adapted to receive fertilizer from the fertilizer hopper 33 through a flexible tube 43. On the lower end of the fertilizer spout 42 is provided a pivoted valve 44 adapted to be operated by an upwardly extending link 45 connected at its upper end to a bell-crank 46 pivoted to the hill-drop structure 37 at 47. To this bell-crank 46 is connected a tension spring 48 which acts upon the same and through the link 45 to maintain the valve 44 normally in its closed position. These elements provide the hill-drop structure with an operating mechanism.

The seed dispensing mechanism is constructed similarly to the fertilizer mechanism and includes generally a hopper structure 50 supported on a transversely extending bar 51 rigidly connected to the tractor and a seed spout structure 52 adjustably connected on the longitudinally extending rig structure 24. Even the seed spout structure 52 is similar to the fertilizer spout structure 37, and thus by unloosening clamping nuts 53, the same can be adjusted along the rig structure 24. By having these spout structures so connected with the rig structure that the same may be adjusted longitudinally along the same, and with respect to each other, different spacings of seed may be had by the planting arrangement.

The seed spout structure 52 includes a seed spout 54 on the lower end of which is a valve 55 operated by a link 56 connected to a bell-crank 57 on the upper end of the structure 52. Acting upon the bell-crank 57 is a tension spring 58 which tends to normally maintain the valve 55 in its closed position. These elements provide the hill-drop structure with an operating mechanism.

Extending between the bell-cranks 46 and 57 is a longitudinally extending connecting element 59 having holes 60 and 61 therein by means of which the bell-cranks are respectively connected at locations upon its length depending upon the adjustment of the structures 37 and 52 along the rig structure 24.

Referring now particularly to Figures 3 and 4, it will be noted that there is provided on the connecting element 59 an inwardly extending transverse supporting structure 62. This transverse supporting structure carries on its inner end a transversely extending bolt 63. This bolt is so alined that it will be engaged by stop elements 64 carried on a chain drive means 65. The chain drive means 65 is connected with drive mechanisms 66 and 67 of the respective hopper devices 33 and 50 for driving the same in unison. These driving mechanisms 66 and 67 tend to maintain an even flow of fertilizer and seed to their respective hill-drop devices 37 and 52. Intermediate the hopper structures 32a and 50 are located chain tightening wheels 68 and 69 over which the chain is guided for maintaining the same in proper driving relationship with the driving mechanisms 66 and 67. In order to maintain the chain drive 65 in proper relation so that stop element 64 will be maintained in vertical alinement with the belt 63, there is provided a guide roller 70.

It should now be apparent with these stop elements 64 on the chain drive mechanism, that as the bolt 63 is engaged by the same, the connecting element 59 will be carried forwardly to cause rotation of the bell-cranks 46 and 57 for the ultimate operation of the valves 44 and 55 of the respective hill-drop structures 37 and 52. As soon as the valve cranks have rotated a sufficient distance, the bolt 63 will leave the stop element 64 and the connecting element 59, and the valves 44 and 55 will be returned to their previous normal position by the springs 48 and 58. The bolt 63 is then in position to be engaged by a succeeding stop element 64 on the chain drive means 65. These stop elements 64 are spaced to open the valves 44 and 55 at the proper time. The spacing on the chain drive 65 will depend upon the spacing of the hill-drop structures with respect to each other. Thus, for a given spacing of the structures 37 and 52, the spacing of the element 64 on the chain drive 65 is such that the hill-drop structures will be operated a second time when the tractor has advanced so that the position of the hill-drop structure 52 will be in the position of the hill-drop structure 37 when it was last operated to deposit fertilizer. In this second position, fertilizer will again be dropped in advance of the seed. In rear of the structure 52 is a covering wheel 71. As the tractor progresses along the field, the covering wheels 71 will close the furrows opened by the furrow openers associated with the hill-drop structures 37 and 52. As viewed in Figure 2, it will be noted that each set of furrow openers is laterally spaced with respect to the other so that fertilizer will be kept properly spaced from the seeds. It is also noted that the covering wheel 71 is of sufficient width to include the furrows formed by both of the furrow openers of the respective hill-drop devices 37 and 52.

Thus far there has been described one means for operating the hill-drop mechanisms in unison. There will now be described another means which may be used for operating the hill-drop mechanisms. This other means takes the form of a check-wire operating device indicated generally at 73. This check-wire device 73 is carried by the transversely extending beams 18 and includes a shaft 74 which extends laterally from one side of the tractor to the other and has on each its ends a trip fork 75 adapted to receive a check wire 76 having the usual spaced buttons 77. As these buttons 77 are received by the fork arm 75, the shaft 74 is pivoted forwardly and this movement is imparted by means of a link 78 to the connecting rod 59. This link 78 is connected by an arm 79 on the shaft 74 through which rearward movement is imparted to the link. The link 78 is connected at its rearward end to the connecting element 59 at 80. Rearward movement is thus given to the connecting element 59, and the valves 44 and 55 will consequently be opened periodically as the tractor advances over the field. When the check-wire device is being used for operating the hill-drop device, the bolt 63 will be removed from the supporting structure 62 carried by the connecting element 59 so that the stop element 64 of the chain drive means will not engage the same.

It should now be apparent that there has been provided for use with a planting structure a fertilizer mechanism whereby fertilizer can be hill-dropped the same as is the seed hill-dropped to thereby provide a planting structure, wherein an economy will be made of fertilizer at the time of the planting of the seed. It should also be apparent that this arrangement is adapted for connection with a tractor, and that the arrangement is so designed and constructed that the hill-drop mechanism can be operated by the check-wire device or by the power take-off mechanism of the tractor.

While various changes may be made in the detail construction of the arrangement, it shall be understood that such changes shall be within the spirit and scope of the present invention as defined by the appended claims.

What is claimed is:

1. In combination, a tractor having a power take-off mechanism, fertilizer dispensing mechanism connected to the tractor, seed planting mechanism connected to the tractor, hill-drop devices associated with each of the respective fertilizer and seed mechanisms, a check-wire operating device carried by the tractor, chain drive means adapted to be driven by said power take-off mechanism, and said check-wire device and chain drive means being respectively arranged to be selectively connectable to the hill-drop devices for operating the same, whereby said hill-drop device may be operated by either said check-wire device or said drive chain means.

2. In a combined fertilizer depositing and seed dispensing arrangement, a supporting structure, a fertilizer dispensing mechanism connected to the supporting structure, a seed depositing mechanism connected to the supporting structure, each of said mechanisms including a hill-drop structure, the one hill-drop structure being located in advance of the other a distance equivalent to the desired spacing between seed in the planted row, means for simultaneously operating the hill-drop structures at intervals timed to the advanced movement of the supporting structure and so that a deposit will be made by the rearwardly disposed hill-drop structure adjacent to the deposit previously made by the forwardly disposed hill-drop structure.

3. In a combined fertilizer dispensing and seed dispensing arrangement, a supporting structure, a fertilizer dispensing mechanism connected to the supporting structure, a seed dispensing mechanism connected to the supporting structure, each of said mechanisms including a hill-drop structure, the one hill-drop structure being located in advance of the other a distance equivalent to the desired spacing between seed in the planted row, means for simultaneously operating the hill-drop structures at intervals timed to the advanced movement of the supporting structure and so that a deposit will be made by the rearwardly disposed hill-drop structure adjacent to the deposit previously made by the forwardly disposed hill-drop structure and at least one of the said hill-drop structures being connected to the supporting structure for longitudinal adjustment whereby the same may be set for different spacing of the seeds in the planted row.

4. In a combined fertilizer and seed dispensing arrangement, a supporting structure, a fertilizer dispensing mechanism connected to the supporting structure, a seed dispensing mechanism connected to the supporting structure, each of said dispensing mechanisms including a hill-drop structure, the hill-drop structure of the fertilizer mechanism being located in advance of the hill-drop structure of the seed dispensing mechanism a distance equivalent to the desired spacing between seed in the planted row, means for simultaneously operating the hill-drop structures at intervals timed to the advanced movement of the supporting structure such that a deposit will be made by the hill-drop structure of the seed dispensing mechanism adjacent to the fertilizer deposit previously made by the hill-drop structure of the fertilizer depositing mechanism.

5. In combination, a tractor, a transverse beam connected to the tractor to extend transversely from its side, a tool-supporting rig and means for connecting the same to the transverse beam for vertical movement, a dispensing mechanism including a hill-drop structure connected to the tool-supporting rig, and a check-wire device for operating the hill-drop structure carried by the transverse beam and adapted to be actuated by the check-wire running adjacent to the side of the tractor, whereby said transverse beam serves to jointly support the rig and the check-wire device.

6. In combination, a tractor, a transverse beam connected to the tractor to extend transversely from its side, a longitudinally extending tool-supporting rig located adjacent to the side of the tractor, means for connecting the rig to the transverse beam for vertical movement, a fertilizer dispensing mechanism including a hill-drop structure connected to the tool-supporting rig, a seed dispensing mechanism including a hill-drop structure connected to the tool-supporting rig, and a check-wire device for operating the hill-drop structures carried by the transverse beam and adapted to be actuated by the check-wire running adjacent to the side of the tractor, whereby said transverse beam serves to support jointly the rig with hill-drop structures and the check-wire device.

7. In combination, a tractor having a power take-off mechanism, a transverse beam connected to the tractor to extend transversely from the side thereof, a tool-supporting rig located adjacent the side of the tractor, means for connecting the rig to the transverse beam for vertical movement, a fertilizer dispensing mechanism including a hill-drop structure carried by the tool rig, a seed dispensing mechanism including a hill-drop structure carried by the rig, a check-wire device carried by the transverse beam, and means for selectively connecting either the power take-off mechanism or the check-wire device with the hill-drop structures.

8. In a combined fertilizer and seed dispensing arrangement, a supporting structure having a longitudinally extending rig, a fertilizer dispensing mechanism on the supporting structure and including a hill-drop structure mounted on the longitudinally extending rig, a seed dispensing mechanism on the supporting structure and including a hill-drop mechanism mounted on the longitudinally extending rig and longitudinally spaced from the fertilizer hill-drop structure including an operating mechanism and at least one of said structures being longitudinally adjustable on the longitudinally extending rig for different spacing of seeds in a planted row, means for connecting the respective operating mechanisms together, means for adjustably connecting the operating mechanism of at least one of the hill-drop structures to the said latter connecting means, and means for actuating said connecting means to effect hill-dropping of the fertilizer and the seeds.

9. In a combined fertilizer and seed dispensing arrangement, a supporting structure having a longitudinally extending rig, a fertilizer dispensing mechanism on the supporting structure and including a hill-drop structure mounted on the longitudinally extending rig, a seed dispensing mechanism on the supporting structure and including a hill-drop mechanism mounted on the longitudinally extending rig and longitudinally spaced from the fertilizer hill-drop structure, each of said hill-drop structures including an operating mechanism, two separate mechanisms alined for operating said hill-drop structures, and means for connecting one of said mechanisms to the hill-drop structures exclusively of the other of said mechanisms.

BERT R. BENJAMIN.